March 24, 1959 J. S. WORK ET AL 2,878,770
INTERNAL EXPANDING LINE-UP PIPE CLAMP
Filed Aug. 9. 1955 8 Sheets-Sheet 1

INVENTORS
J.S. Work
E.H. Work
BY Kimmel & Crowell
ATTORNEYS

INVENTORS
J. S. Work
E. H. Work
BY Kimmel & Crowell
ATTORNEYS

INVENTORS
J. S. Work
E. H. Work
BY Kimmel & Crowell
ATTORNEYS

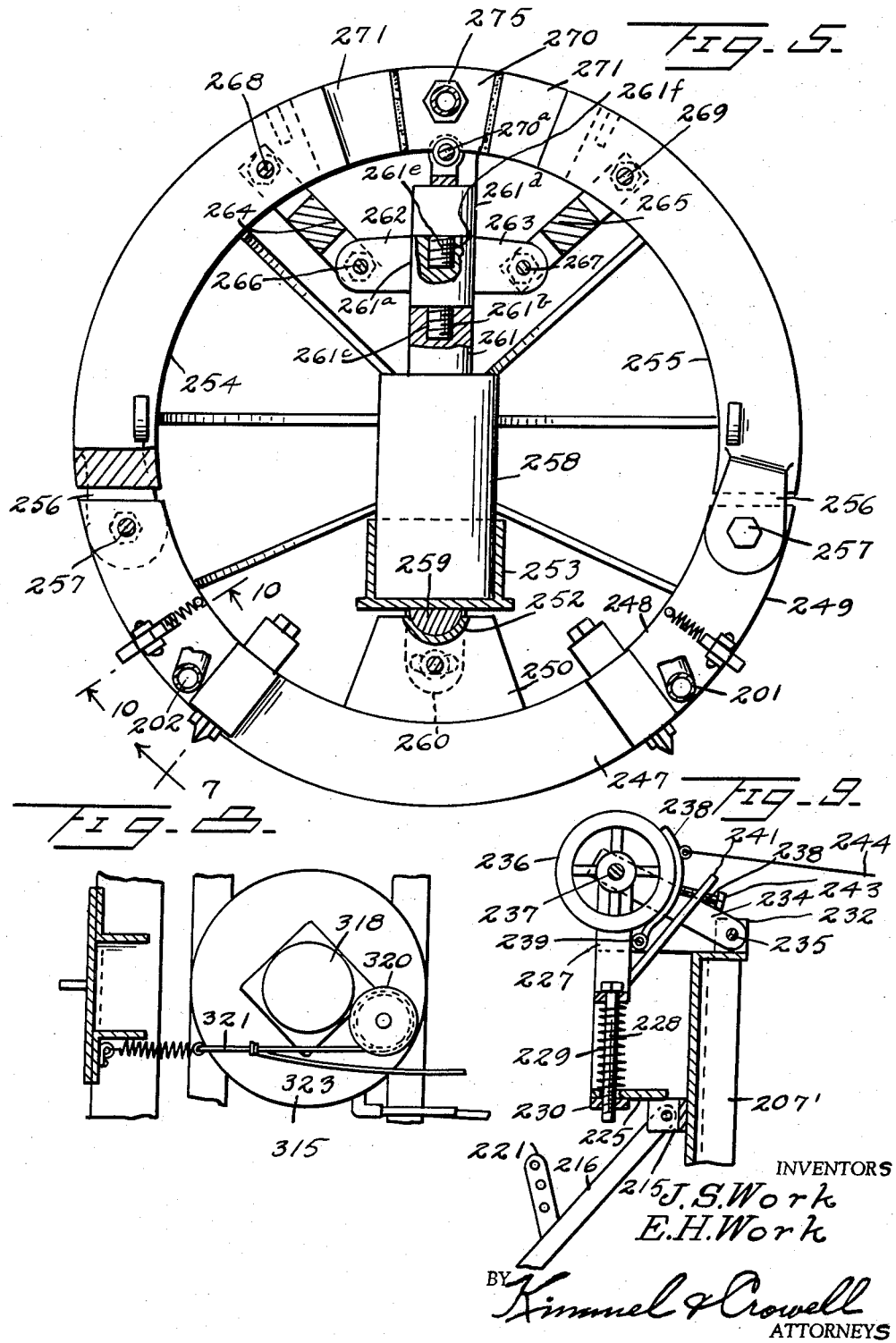

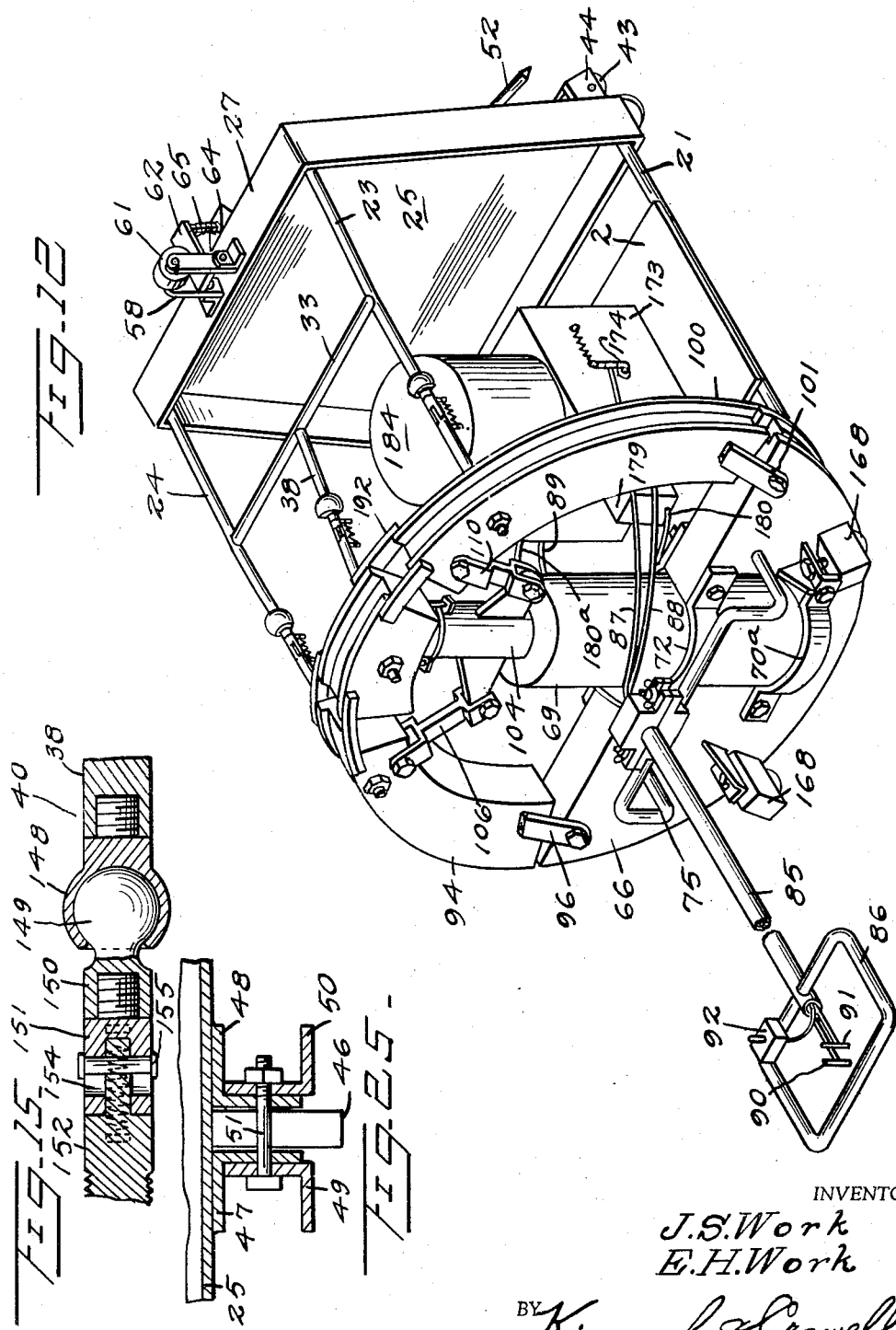

March 24, 1959 — J. S. WORK ET AL — 2,878,770
INTERNAL EXPANDING LINE-UP PIPE CLAMP
Filed Aug. 9, 1955 — 8 Sheets-Sheet 6

INVENTORS
J.S. Work
E.H. Work
BY Kimmel & Crowell
ATTORNEYS

March 24, 1959 J. S. WORK ET AL 2,878,770
INTERNAL EXPANDING LINE-UP PIPE CLAMP
Filed Aug. 9, 1955 8 Sheets-Sheet 7
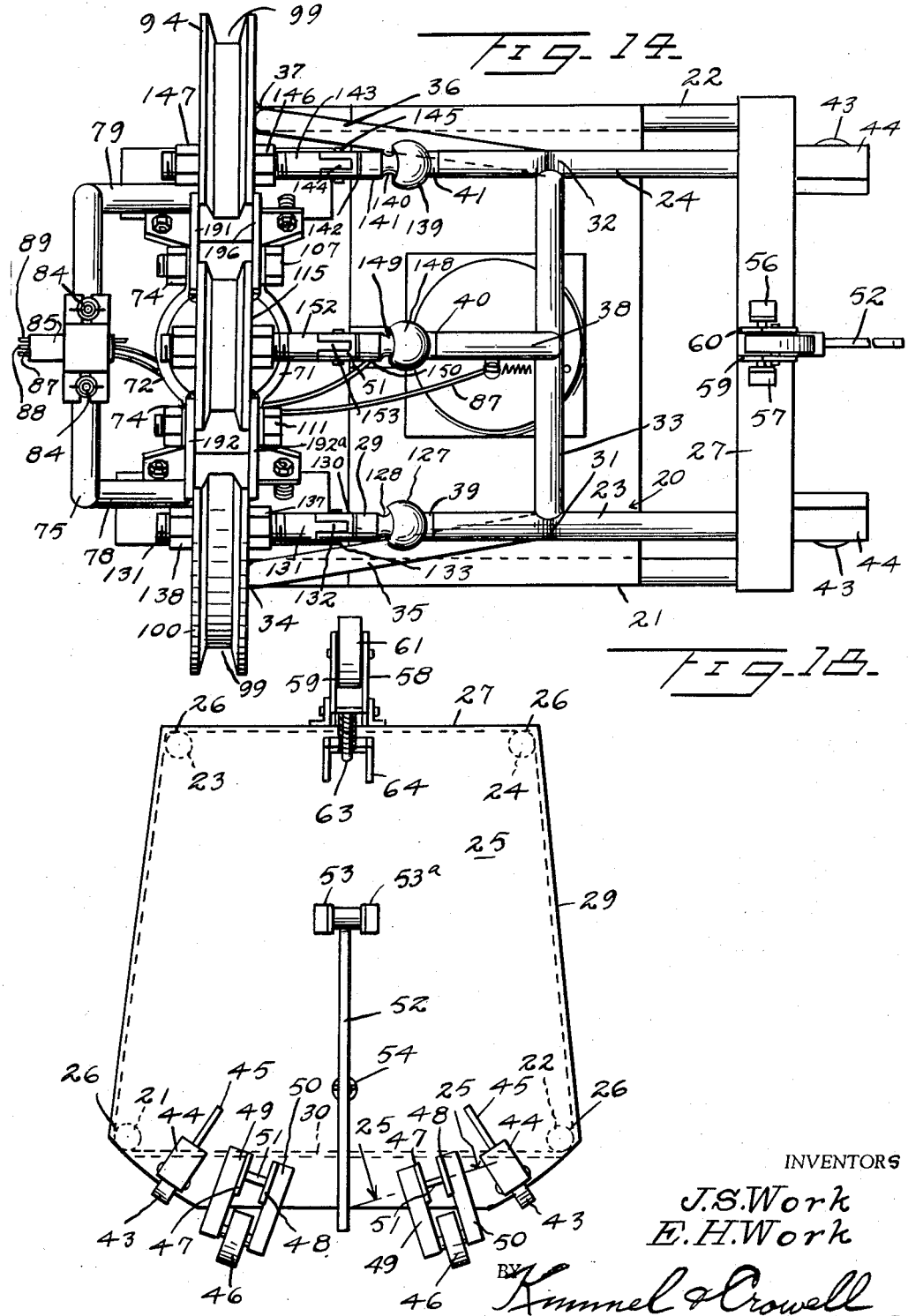
INVENTORS
J.S. Work
E.H. Work
BY Kimmel & Crowell
ATTORNEYS

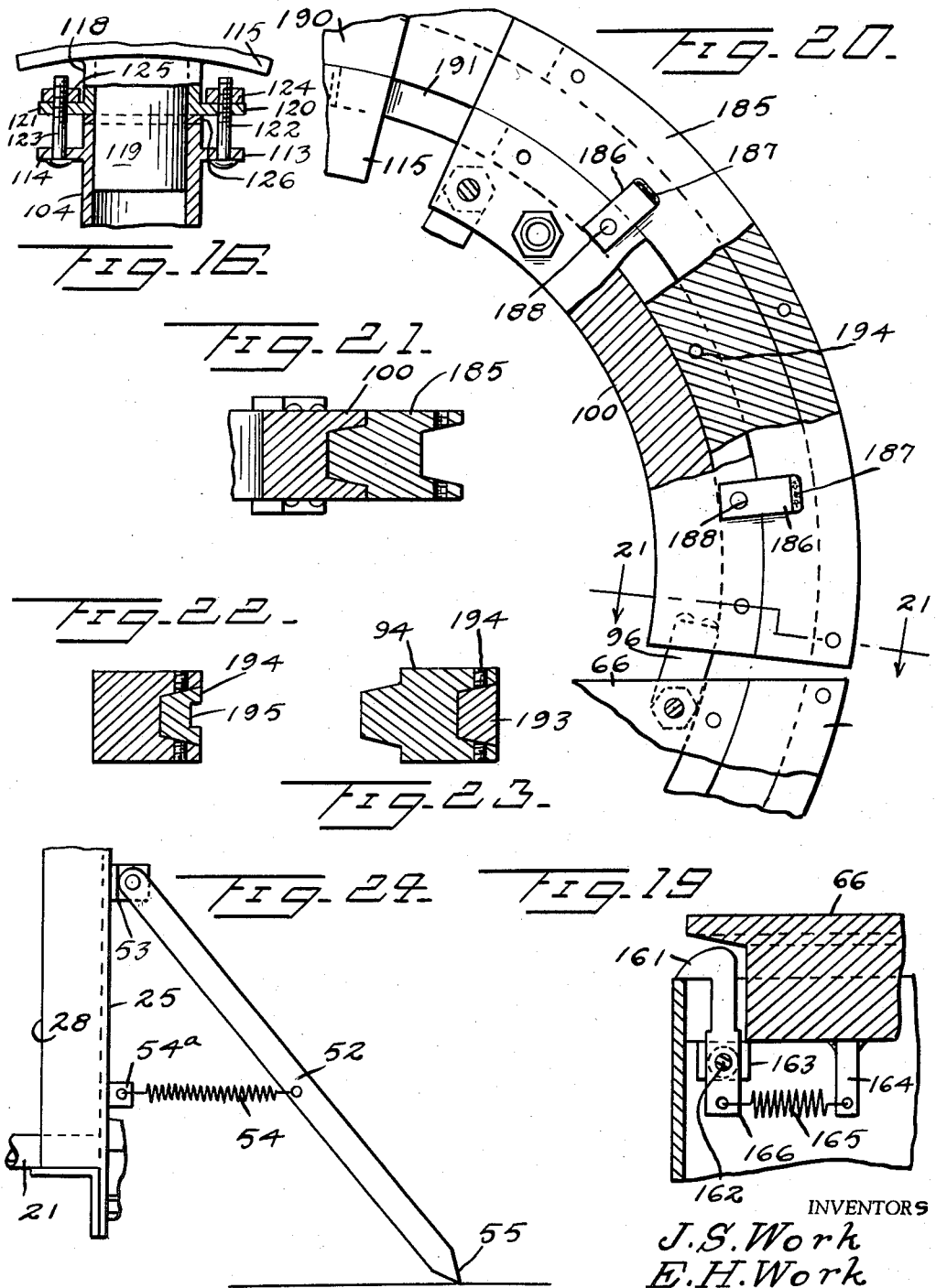

United States Patent Office 2,878,770
Patented Mar. 24, 1959

2,878,770

INTERNAL EXPANDING LINE-UP PIPE CLAMP

John Scott Work, Butler, Ala., and Ervan H. Work, Wanette, Okla.

Application August 9, 1955, Serial No. 527,269

3 Claims. (Cl. 113—103)

The present invention relates to internal expanding line-up pipe clamps, particularly those used to line up adjacent pipe ends prior to welding the pipes together.

The primary object of the invention is to provide a pipe clamp of the above described character which will restore the cylindrical shape of the pipe ends and maintain the pipes in juxtaposed aligned relation during the welding operation.

Another object of the invention is to produce a clamp according to the invention which will be readily portable and easily moved from joint to joint within the pipe.

A further object of the invention is to provide an internal pipe clamp that has an electrically operated hydraulic system for actuating the clamping members.

A still further object of the invention is to provide a structure of the class described in which adapters are provided for varying the pipe sizes with which the clamp is adapted to operate.

Another object of the invention is to provide a pipe clamp of the above character with replaceable clamp shoe faces to permit ready replacement and the use of faces of varying shapes as required by the exigencies of the particular project.

A further object of the invention is to provide an internal pipe clamp as described above which will be inexpensive to manufacture, efficient in use and extremely simple to assemble.

Other objects and advantages will become apparent in the following specification when read in light of the attached drawings, in which:

Figure 5 is an enlarged transverse cross section of the invention taken along the line 5—5 of Figure 2, looking in the direction of the arrows;

Figure 7 is an enlarged fragmentary detail cross section taken along the line 7—7 of Figure 5, looking in the direction of the arrows;

Figure 8 is an enlarged fragmentary detail showing of the hydraulic valve control taken along the line 8—8 of Figure 2, looking in the direction of the arrows;

Figure 9 is a fragmentary vertical cross section of the brake mechanism taken along the line 9—9 of Figure 6, looking in the direction of the arrows;

Figure 10 is an enlarged fragmentary detail cross section of the latch structure taken along the line 10—10 of Figure 5, looking in the direction of the arrows;

Figure 11 is an enlarged detailed view partly in cross-section of the handle tube clamping member;

Figure 12 is a perspective view of a modified form of the invention;

Figure 14 is a top plan view of the invention illustrated in Figure 12;

Figure 15 is a horizontal cross-section taken on the line 15—15 of Figure 13, looking in the direction of the arrows;

Figure 16 is an enlarged detail view of the ram attachment, illustrated in Figure 12, shown partially in section;

Figure 18 is an end elevation of the back plate illustrated in Figure 12, with parts broken away;

Figure 19 is an enlarged fragmentary cross-section of the pipe end engaging member, taken on the line 19—19 of Figure 17, looking in the direction of the arrows;

Figure 20 is an enlarged fragmentary end view, partially in section, of an auxiliary shoe attachment;

Figure 21 is a transverse cross-section taken on the line 21—21 of Figure 20, looking in the direction of the arrows;

Figure 22 is a transverse cross-section of a shoe, showing a back-up plate attached thereto;

Figure 23 is a transverse cross-section of a shoe, showing a modified form of back-up plate attached thereto;

Figure 24 is an enlarged fragmentary view of the brake mechanism attached to the invention illustrated in Figure 12;

Figure 25 is an enlarged fragmentary cross-section of the auxiliary rear wheels, taken on the line 25—25 of Figure 18, looking in the direction of the arrows, and Figure 26 is a fragmentary plan view of the handle of the clamp illustrated in Figure 1.

Figure 1:
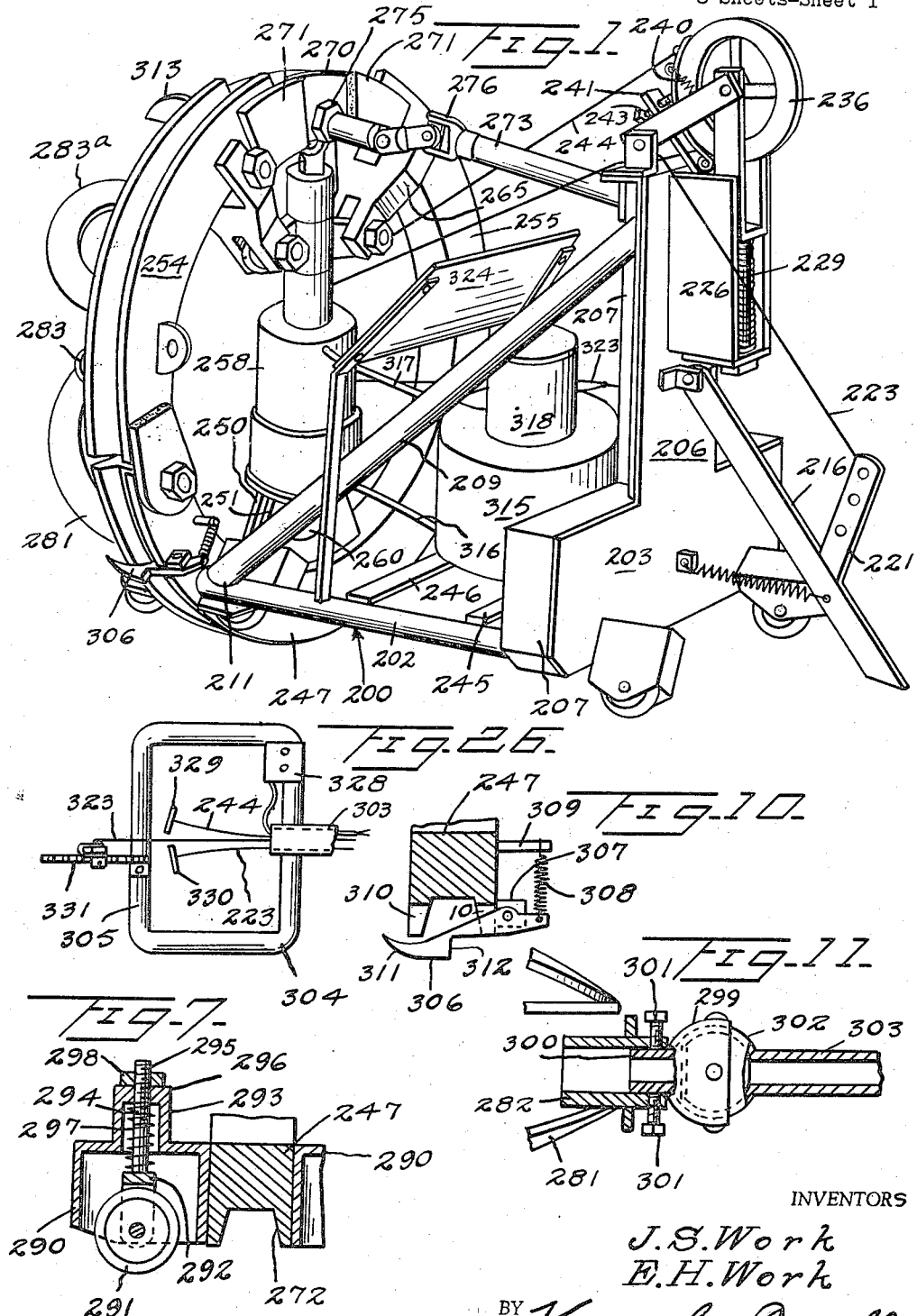
Figure 1 is a perspective view of the preferred form of the invention.
Figure 2:
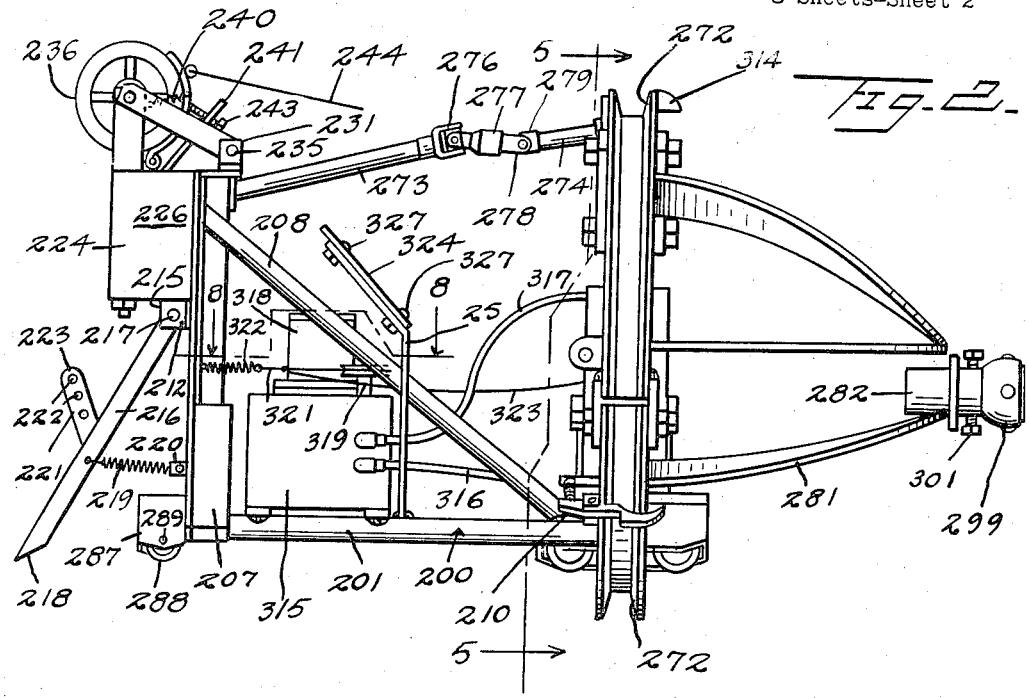
Figure 2 is a side elevation of the invention.
Figure 3:
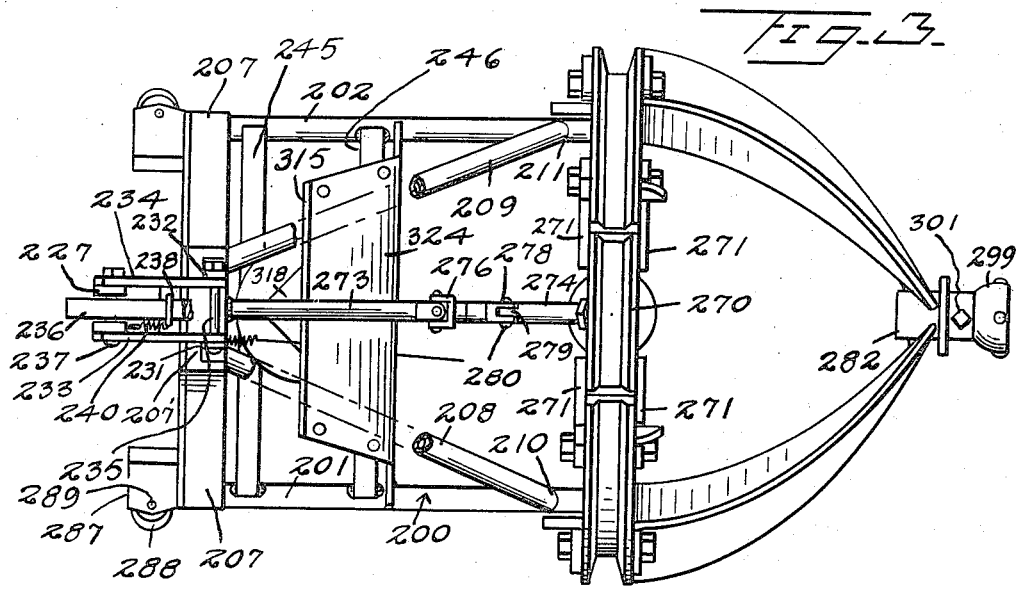
Figure 3 is a top plan view of the invention.
Figure 4:
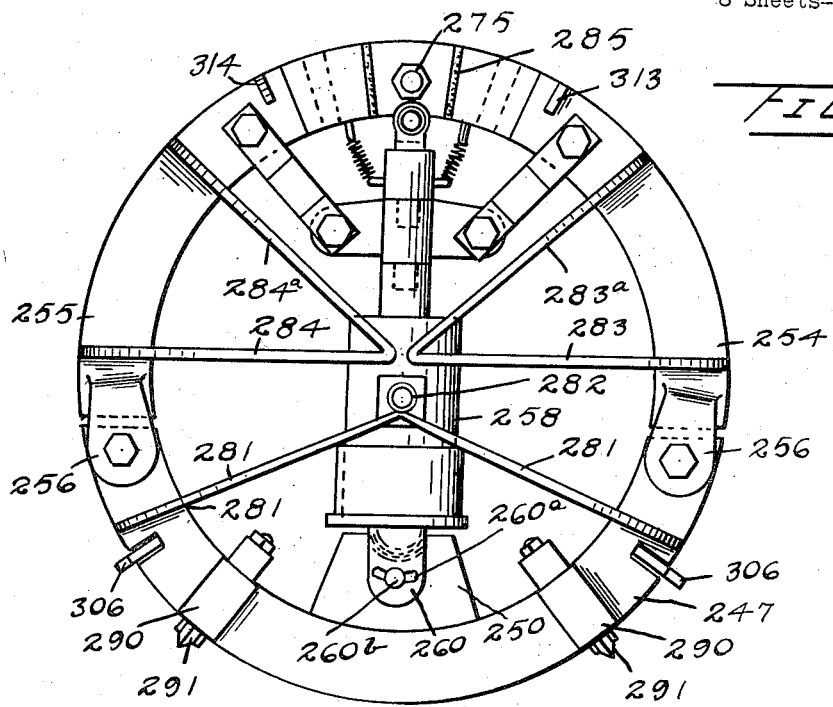
Figure 4 is a front elevation of the invention.
Figure 6:
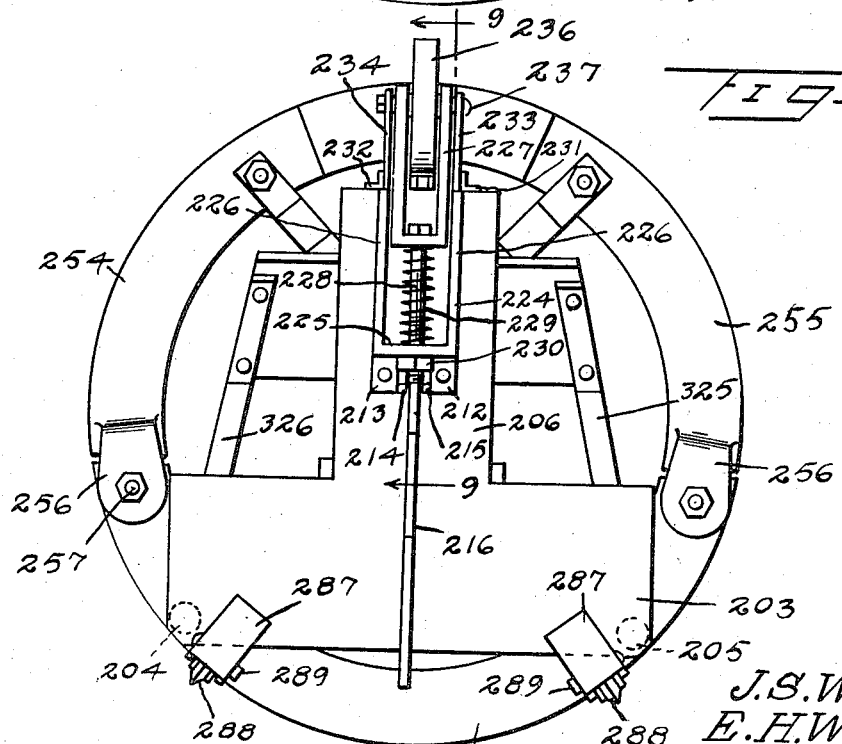
Figure 6 is a rear elevation of the invention.

Referring to the drawings in detail wherein like reference numerals indicate like parts throughout the several figures, and more particularly to Figures 1 through 11, and 26, wherein the preferred form of the invention is illustrated, the reference numeral 200 indicates generally a frame formed of tubular bottom members 201 and 202. A back plate 203 is joined at its lower outer corners 204 and 205 to the rear ends of the bottom members 201 and 202. The back plate 203 has an integral upstanding central portion 206. The back plate 203 is provided with a continuous peripheral flange 207 extending forwardly therefrom. The central portion 206 is likewise provided with a pair of forwardly extending flanges 207'. A pair of braces 208 and 209 are connected to the top of the upstanding portion 206 and diverge forwardly and downwardly and have their forward ends secured to the forward ends of the bottom members 201 and 202 at 210 and 211 by means of welding or the like.

A pair of ears 212 and 213 are secured to the central area of the upstanding portion 206 of the back plate 203. The ears 212 and 213 are provided with rearwardly extending flanges 214 and 215 which are spaced apart transversely. A brake arm 216 is pivoted between the flanges 214 and 215 by means of a pivot bolt 217. The lower end of the brake arm 216 is provided with a point 218 to engage the pipe wall to prevent backward movement of the clamp. A spring 219 is secured to the brake arm 216 at one end and to an ear 220 mounted on the back plate 203 at the other end. Spring 219 normally biases the point 218 of the brake arm 216 into engagement with the pipe wall. A release arm 221 is secured to the brake arm 216 and is perforated as at 222 to receive a brake releasing cable 223 which is secured thereto. The operation of the brake cable 223 will be described below.

A wheel mounting housing 224 is secured to the upper rear face of the upstanding portion 206 by any suitable means. The housing 224 is provided with a bottom wall 225 and side walls 226. A wheel yoke 227 is formed generally in a U-shape with the bight thereof posititioned at the lower end between the walls 226 of the housing 224. A guide bolt 228 extends through the bight of the yoke 227 and through the bottom wall 225 of the housing 224. A spring 229 is positioned between the yoke 227 and the bottom wall 225 about the bolt 228. A nut 230 is positioned on the free end of the bolt 228 and holds the yoke 227 within the housing 224. The yoke 227 is adapted to telescope within the housing 224 by compressing the spring 229, thus sliding the bolt 228 downwardly through the bottom wall 225 of the housing 224. A pair of ears 231 and 232 extend upwardly from the flange 207 at the top edge of the upstanding portion 206 of the back plate 203. A pair of guide levers 233 and 234 are positioned between the ears 231 and 232 and are pivoted thereto by means of a pivot bolt 235. A wheel 236 is positioned between the arms of the wheel yoke 227 and between the guide levers 233 and 234. A pivot bolt 237 extends through the guide levers 233 and 234, the wheel yoke 227 and the wheel 236 mounting the wheel 236 for rotation therein.

An arcuate brake 238 is pivoted to the upper portion of the housing 224 as at 239 and is maintained in resilient engagement with the wheel 236 by means of a spring 240. An arm 241 is secured to the housing 224 and extends rearwardly under the brake 238 and carries a brake adjusting screw 242 which can be brought into engagement with the brake 238 by turning the hand wheel 243. A cable 244 extends forwardly from the brake 238 in a manner to be later described to permit the brake 238 to be applied by the clamp operator to retard the forward speed of the clamp in downhill installations of pipe.

Cross members 245 and 246 are connected at their opposite ends to the bottom members 201 and 202 of the frame 200 and extend parallel to the back plate 203 in spaced-apart relation.

A clamping shoe 247 is positioned at the forward ends of the bottom members 201 and 202 and is welded or otherwise secured thereto, with the shoe 247 extending transversely of the clamp parallel to the back plate 203. The shoe 247 comprises an arcuate segment having concentric inner and outer edges 248 and 249. A pair of upstanding longitudinally spaced-apart parallel support members 250 and 251 extend upwardly from the inner edge 248 of the shoe 247 and are secured thereto by means of welding or the like. A semi-cylindrical bearing 252 is secured to the upper edges of the support members 250 and 251. A pair of side shoes 254 and 255 are positioned over opposite upper end portions of the shoe 247. Each of the shoes 254 and 255 are provided with downwardly extending pivot ear 256 which engage over the forward and rear faces of the shoe 247 and are pivotally secured thereto by means of pivot bolts 257. A cylindrical cup 253 is positioned over the supports 250 and 251 and is provided on the bottom thereof with a semi-cylindrical shaft 259 which is adapted to seat in the bearing 252 for oscillating pivotal action therein. A pair of ears 260 extend downwardly from the cup 253 on opposite sides of the support members 250 and 251 and are transversely, arcuately slotted as at 260$^a$ to engage over a pin 260$^b$ mounted in the supports 250 and 251. The pin 260$^b$ maintains the cup 253 on the supports 250 and 251 with the shaft 259 supported by the bearing 252.

A hydraulic ram 258 is positioned with its base supported in the cup 253. The ram 258 is provided with a piston rod 261 extending upwardly therefrom. Piston rod 261 is adapted to be moved inwardly and outwardly of the ram 258 by means of a piston (not shown). Oppositely extending lugs 262 and 263 project laterally from an extension 261$^a$ of the piston rod 261. A screw-threaded connector 261$^b$ projects from the extension 261$^a$ and is carried by a screw-threaded socket 261$^c$ in the piston rod 261. Links 264 and 265 having opposite-ly-extending bifurcated ends are pivotally secured to the lugs 262 and 263, respectively, by means of pivot bolts 266 and 267. The outer ends of the links 264 and 265 are pivotally secured to the upper ends of the shoes 254 and 255, respectively, by means of pivot bolts 268 and 269. An upper shoe 270 is pivotally secured by pivot 270$^a$ to the outer end of an extension 261$^d$ connected to the piston rod extension 261$^a$ by means of a threaded connector 261$^e$ carried by a screw-threaded socket 261$^f$ in the extension 261$^a$. The upper shoe 270 is provided with oppositely-extending, spaced-apart pairs of guide plates 271 which are slidably engaged over the forward and rear faces of the shoes 254 and 255. Each of the shoes 247, 254 and 270 are peripherally recessed as at 272, with the recess having outwardly diverging walls.

An upwardly and forwardly extending tubular support member 273 is secured at its rear end to the upper end of the upstanding portion 206. A rearwardly extending arm 274 is secured at its forward end to the shoe 270 by means of nuts 275 which engage the opposite, forward and rear faces of the shoe 270. A universal joint 276 is mounted on the forward end of the tubular member 273 and has a link 277 extending forwardly therefrom with the forward end thereof bifurcated as at 278. A tongue 279 formed on the rear end of the arm 274 extends into the bifurcations 278 and is pivotally secured thereto by means of the pivot pin 280.

A pair of arcuate guide plates 281 extend forwardly and inwardly from the shoe 247 and are connected at their forward ends to a tube 282. An arcuate guide plate 283 is secured to the shoe 254 and extends forwardly and inwardly to a position adjacent to but spaced from the tube 282. A second arcuate guide plate 283$^a$ is secured to the shoe 254 in circumferentially spaced apart relation to the plate 283. The plate 283$^a$ likewise extends forwardly and inwardly and is joined to the forward inner end of the plate 283. The shoe 255 is likewise provided with forwardly extending arcuate guide members 284 and 284$^a$ which have their forward ends joined adjacent to and spaced from the tube 282. The guide plates 281, 283, 283$^a$, 284 and 284$^a$ provide a guiding nose for the clamp to quickly align the new section of pipe with that already installed.

The back plate 203 is provided with a pair of wheel housings 287 which are positioned oppositely at the bottom of the back plate 203 with the axial centers of the housings 287 diverging downwardly. Wheels 288 are pivotally secured by means of pivot pins 289 in the housings 287 and extend downwardly therefrom. The wheels 288 are formed with a V-shaped outer edge with the apex of the V outermost. The shoe 247 is provided with a pair of wheel housings 290 on the forward and rear face thereof. A wheel 291 is positioned within each housing 290 and is pivotally carried therein on a yoke 292. A spring housing 293 extends upwardly from the housing 290 and a guide bolt 294 extends through the spring housing 293 and is secured at its lower end to the yoke 292. The outer end of the bolt 294 is screw-threaded as at 295 and extends through the upper end 296 of the spring housing 293. A spring 297 is positioned about the bolt 294 and has its lower end in engagement with the yoke 292 and its upper end in engagement with the upper wall 296 of the spring housing 293. The bolt 294 is maintained in its position within the spring housing 293 and housing 290 by means of a nut 298. The spring 297 maintains the wheel 291 in its outermost position in a resilient manner so that when pressure is brought to bear upon the wheel 291, by movement of the shoe 247 outwardly, the wheel 291 will move into the housing 290. The outer edge of the wheel 291 is formed V-shaped with the apex of the V extending outwardly.

An outer bell universal joint member 299 is provided with a tubular extension 300 telescoped in the outer end of the tube 282 and secured therein by set screws 301. An inner bell universal joint member 302 is mounted for universal action within the outer bell 299 and has an elongated tubular handle shaft 303 extending therefrom.

The shoe 247 is provided at spaced points on its outer periphery with hooks 306 which are pivotally secured to ears 307 extending rearwardly from the shoe 247. The hooks 306 are biased by a spring 308 outwardly from the shoe 247. The spring 308 is secured to a pin 309 on the shoe 247. The shoe 247 is slotted as at 310 to permit the hook 306 to pivot inwardly completely within the outer edge of the shoe 247. The forward outer surface of the hook 306 is formed as an arcuate cam 311 to engage the new pipe, thus moving the hook 306 inwardly as the pipes are brought into engagement. As the clamp is moved forwardly in the pipe to the open end thereof the hook 306 will move outwardly so that edge 312 thereof will engage the free end of the pipe through which the clamp is moving, thus preventing the clamp from being moved rearwardly as the new pipe is positioned thereover.

The shoes 254 and 255 are provided with forwardly extending arcuate cam members 313 and 314. The cam members 313 and 314 also assist in aligning the new pipe with the old pipe as the new pipe is brought into position prior to being clamped for welding.

A hydraulic pump 315 is mounted on the cross frame members 245 and 246 and secured thereto by any suitable means such as welding or the like. The hydraulic pump is connected to the hydraulic ram by means of a lower flexible conduit 316 and an upper flexible conduit 317. An electric motor 318 is mounted on top of the pump 315 and is operatively associated therewith so that hydraulic fluid from the pump 315 will move through the conduits 316 or 317 when the electric motor 318 is energized. A control valve (not shown), normally biased in one direction, is positioned within the pump 315 and is adapted to be operated by a shaft 319 extending from the pump 315. A pulley 320 is mounted on the upper free end of the shaft 319 and has a cable 321 engaged thereabout. The free end of the cable 321 is connected by means of a spring 322 to the upstanding portion 206 of the back plate 203. The spring 322 normally biasing the control valve of the pump 315 in a direction opposite the biasing means contained within the pump 315. The spring 322 having sufficient strength to overcome the normal biasing means of the valve within the pump 315 and reverse the direction of flow of fluid from the pump 315 with relation to the conduits 316 and 317. A control cable 323 extends forwardly from the cable 321 and is adapted to overcome the spring 322 to thus control the shaft 319 to change the direction of flow of fluid from the pump 315. Thus it can be seen that the ram 258 can be moved upwardly or downwardly under positive pressure in both directions by reversing the direction of flow of the fluid from the pump 315. A shield 324 is positioned adjacent the electric motor 318 on a line between the motor 318 and the upper shoe 270. Shield support arms 325 and 326 extend upwardly from bottom members 201 and 202, respectively, of the frame 200, shield 324 being secured to the shield support arms 325 and 326 by any suitable means such as bolts 327.

The tubular handle shaft 303 is provided with a handle 304 secured on the outer end thereof. The handle 304 is formed into a loop 305 and supports an electric switch 328 for controlling the motor 318. Grip 330 is secured to the end of brake release cable 223 and grip 329 is secured to the end of brake release cable 244, so that the cables 223 and 244 may be pulled to release the brakes 216 and 238, respectively. A ratchet handle 331 is secured to the outer end of the valve operating cable 323 so that the valve pulley 320 can be rotated and held in adjusted position.

In the use and operation of the preferred form of the invention, as illustrated in Figures 1 through 11, the clamp is positioned within a pipe line which is having new sections of pipe welded thereto at spaced intervals so that the pipe ends can be clamped in abutting engagement throughout the peripheral edges thereof. The clamp is positioned by means of the hooks 306 with the shoes 247, 254, 255 and 270 extending with half of their width contained within the old pipe and the other half extending out of the old pipe. The new pipe is brought into position and moved longitudinally until it is engaged over the shoes 247, 254, 255 and 270 in abutting engagement with the old pipe. At this time the shoes are moved outwardly into engagement with the old and new pipe ends by operating the electric motor 318, pumping the fluid through conduit 316 to the bottom of the ram 258; the wheels 291 moving into the housings 290, and the hooks 306 moving out of engagement with the old pipe. The pipes are then welded together throughout their peripheral edges. The pump 315 is reversed by means of pulling on the cable 323 and rotating the shaft 319 which reverses the direction of flow of fluid and the ram 258 receives fluid through the conduit 317, thus moving the piston rod 261 within the ram 258 and bringing the shoes 247, 254, 255 and 270 out of engagement with the pipes. In the case of the piping being laid uphill, the brake arm 216 will prevent backward movement of the clamp as it is drawn to the new position by means of the spring 219 biasing the point 218 into the pipe wall. However, should it become necessary to move the clamp backward, the point 218 of the brake arm 216 can be moved out of engagement with the pipe by pulling on a cable 223.

The wheel 236 serves to maintain the clamp aligned with pipe in which it is operating and the brake 238 can be used to prevent the clamp from moving too fast when the pipes are being installed on the downward slope of a hill. Should it be desirable to release the brake 238, the cable 244 can be pulled, thus moving the brake 238 out of engagement with the wheel 236. An electric line (not shown) extends from the motor 318 forwardly through the tubular handle 303. The cables 223, 244 and 323 likewise extend through the tubular handle 303 in the same way as the operating cables extend through the tubular handle 85 of the modified form of the invention, illustrated in Figure 12.

Figure 13:
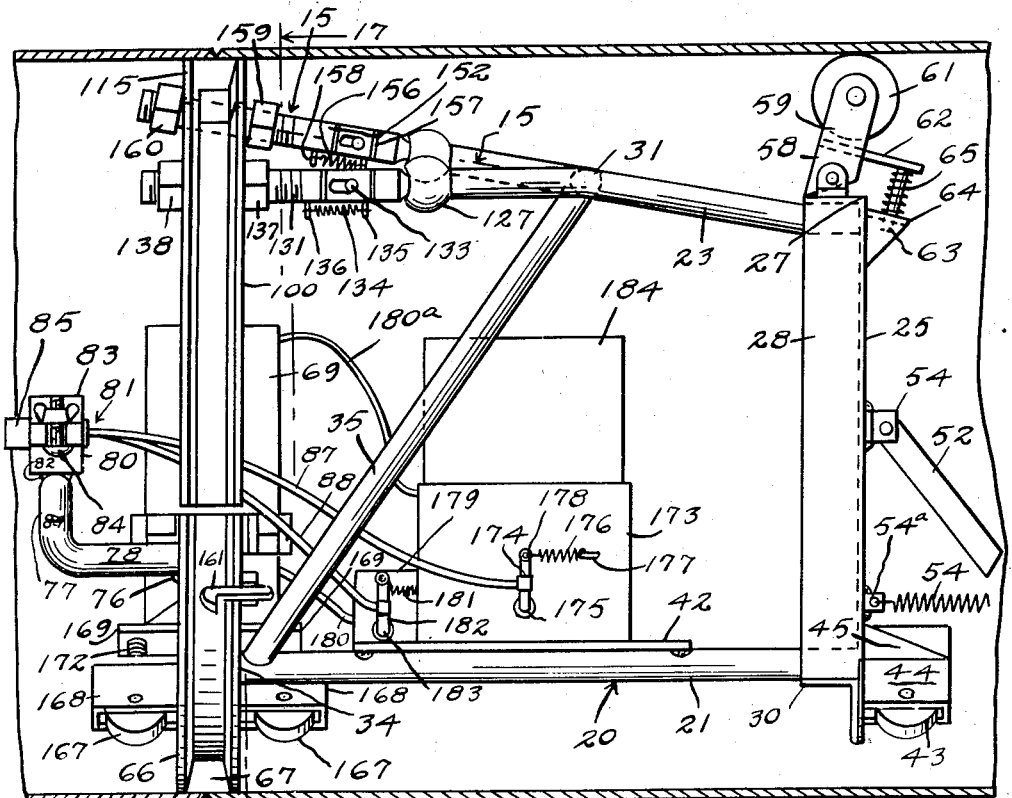
Figure 13 is a side elevation of the invention illustrated in Figure 12, shown in a pipe with the shoes expanded.
Figure 17:
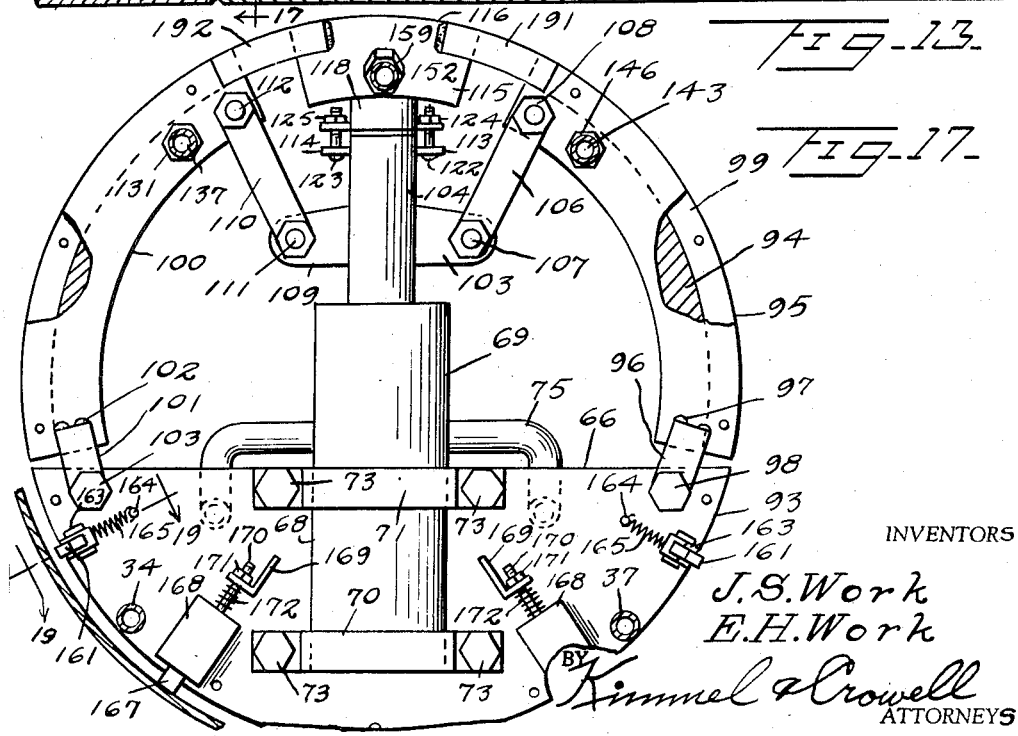
Figure 17 is a transverse cross-section of the invention taken on line 17—17 of Figure 13, looking in the direction of the arrows.

Referring to Figures 12 through 25 of the drawings in detail, wherein a modified form of the invention is illustrated, the reference numeral 20 indicates, generally, a frame. The frame 20 comprises a pair of horizontal tubular bottom members 21 and 22, and a pair of upper frame members 23 and 24. A plate 25 is welded to the rear ends of the tubular frame members 21, 22, 23 and 24, as indicated at 26 in Figure 18. The plate 25 is provided with an upper forwardly extending flange 27, a pair of forwardly extending side flanges 28 and 29, and a bottom flange 30. The upper frame members 23 and 24 are inclined upwardly from the plate 25 and are then bent at points 31 and 32 to extend horizontally. A cross frame member 33 extends between the frame members 23 and 24, and is connected thereto at points 31 and 32.

From the forward end 34 of the frame member 21, an inwardly and rearwardly extending upright frame member 35 extends to the point 31 on the frame member 23. A similar upright frame member 36 extends inwardly and rearwardly from the point 37 on the frame member 22 to the point 32 on the frame member 24. A tubular stub member 38 extends parallel to the side frames 23 and 24 from the center point of the cross frame 33, the forward ends 39, 40 and 41 of the frame members 23, 38 and 24, respectively, being in approximate transverse alignment. A plate 42 extends horizontally across the lower frame members 21 and 22 for a purpose to be later described.

The lower end of the plate 25 is provided with a pair of wheels 43. The wheels 43 are mounted so as to have their axes at right angles to a pair of radii, of the pipe in which the clamp is to be used, equidistant from a vertical line extending through the pipe center. The wheels 43 are supported in a rectangular open-bottomed box 44 which is secured to the plate 25 by means of welding or the like. The box 44 is braced by means of web 45. A second set of wheels 46 are secured to the bottom of the plate 25 by means of angle iron bracket members 47 and 48, which are welded to the plate 25 in spaced parallel relation, with their upstanding sides extending parallel to another pair of radii of the pipe within which the clamp is operating. The wheels 46 are auxiliary wheels which are used as will be later described. A pair of fork-forming angle irons 49 and 50 extend downwardly from the angle irons 47 and 48 and are secured thereto by means of bolts 51.

The brake 52 is pivotally engaged at one end between a pair of brackets 53 and 53a secured to the center of the plate 25 by welding or other suitable means. The brake 52 is normally urged toward the plate 25 by means of spring 54, extending between the brake 52 and a bracket 54a welded to the lower portion of the plate 25. The brake 52, as illustrated in Figure 24, is provided with a pointed end 55 which is adapted to engage the pipe and prevent back motion of the clamp away from the point at which the work is being done. It should be noted that suitable shoes, multiple points, and/or other engaging elements (none of which is shown in the drawings) may be used instead of the single point 55 when desired.

The flange 27 of the back plate 25 is provided with a pair of upstanding ears 56 and 57, between which is pivoted a fork 58 consisting of a pair of arms 59 and 60 having a wheel 61 pivoted therebetween at their outer ends. A rearwardly extending plate 62 is welded between the arms 59 and 60 and has a pin 63 extending downwardly therefrom into a bracket 64 welded to the rear face of the plate 25. A spring 65 is mounted on the pin 63 and engages against the plate 62 and the bracket 64 to normally urge the wheel 61 against the pipe within which the clamp is positioned.

A shoe 66 is connected by welding or the like to the forward ends of the frame members 21 and 22 as at 34 and 37. The shoe 66 is peripherally recessed as at 67, with the recess having outwardly diverging walls. The central portion of the shoe 66 has an opening 68 passing therethrough. A ram 69 is seated in the opening 68 and is clamped therein by means of straps 70, 71 and 72. A fourth strap 70a is positioned oppositely to the strap 70. Bolts 73 pass through the ends of the straps 70, 70a, 71 and 72 and the shoe 66 and are secured therein by means of nuts 74.

A handle 75 extends forwardly of the shoe 66 and has its rear ends connected to the shoe 66 by means of welding 76 or the like. The handle 75 comprises an upstanding inverted U-shaped portion 77 having rearwardly directed legs 78 and 79 extending at right angles to the U-shaped portion. The lower end 80 of a clamp 81 is welded as at 82 to the upper face of the U-shaped portion 77 of the handle 75. An upper portion 83 of the clamp 81 is positioned over the lower portion 80 and is secured thereto by means of wing bolts 84. The clamp elements 80 and 83 of the clamp 81 are internally recessed to receive a tubular handle pole 85.

The outer end of the tubular handle pole 85 is provided with a loop hand engaging member 86. Control cables 87 and 88 along with electric cable 89 extend through the handle pole 85 and are connected to control handles 90 and 91 and electric switch 92 for purposes which will be later described. The outer face 93 of the shoe 66 is formed in the arc of a circle having the same diameter as the internal diameter of the pipe to be clamped.

A shoe 94 having an external face 95 formed in the arc of the same circle as the shoe 93 is pivotally attached to the shoe 66 by means of bracket 96 welded as at 97 to the shoe 94 and secured by pivot bolt 98 to the shoe 66. The peripheral length of the shoe 94 is approximately half that of the shoe 66. The outer face 95 of the shoe 94 is peripherally grooved as at 99 for purposes to be later assigned.

A second shoe 100 has a bracket 101 secured thereto by welding as at 102, and the bracket 101 is pivotally secured to the shoe 66 by means of pivot bolt 103. The shoe 100 is identical in every respect to the shoe 94 and is mounted opposite to the shoe 94.

The ram 69 has a piston rod 104 extending upwardly therefrom and has secured thereto an ear 105. The ear 105 is connected to the outer end of the shoe 94 by means of a link 106, the inner end of the link 106 being pivoted to the ear 105 by means of pivot bolt 107, while the outer end of the link 106 is pivoted to the shoe 94 by means of a pivot bolt 108. A second ear 109 extends oppositely to the ear 105 and is secured in a like manner to the piston rod 104. A link 110 is pivotally connected to the ear 109 by means of pivot bolt 111 and has its opposite end pivotally connected to the outer end of the shoe 100 by means of pivot bolt 112. The outer end of the piston rod 104 is provided with a pair of ears 113 and 114.

A top shoe 115 is provided with an outer face 116 formed in the arc of the same circle as the shoes 66, 94 and 100. The shoe 115 is provided with a peripheral groove 117 having the same configuration as the peripheral grooves in the shoes 66, 94 and 100. The inner face of the shoe 115 is provided with a boss 118 which has a cylindrical extension 119 depending therefrom. The piston rod 104 is hollow and adapted to telescopically receive the cylindrical extension 119 therein. The boss 118 is provided with a pair of ears 120 and 121 which are aligned with the ears 113 and 114. Bolts 122 and 123 are passed through openings in the ears 113, 120 and 114, 121, respectively, and are secured therein by means of nuts 124 and 125. A spacer washer 126 is positioned between the top of the piston rod 104 and the bottom of the boss 118 and the bolts 122 and 123 are drawn tight, binding the piston rod 104 to the boss 118. It should be noted that the washers 126 permit the spacing between the piston rod 104 and the shoe 115 to be varied as required.

The forward end 39 of the frame member 23 is provided with a ball socket 127. A ball 128 is swivelly mounted in the socket 127 and has a shaft 129 extending forwardly therefrom. A bifurcated member 130 is screw-threaded into the end of the shaft 129. A threaded shaft 131 has a reduced portion 132 extending from the rear end thereof between the bifurcated elements of the bifurcated member 130. The bifurcated elements of the bifurcated member 130 and the reduced portion 132 of the shaft 131 are provided with a slotted aligned bore through which a pin 133 extends, maintaining the bifurcated member 130 and the shaft 131 in engagement with each other. A spring 134 extends from a pin 135 on the bifurcated member 130 to a pin 136 on the shaft 131. The outer end of the shaft 131 passes through the shoe 100 and has an inner nut 137 engaging the rear face of the shoe 100 and an outer nut 138 engaging the outer face of the shoe 100, whereby the shoe 100 is supported from the frame 20. It should be noted that the ball joint 127—128 permits the shaft 131 to swivel in any desired direction, while the extensible joint formed by the shaft 131 and the bifurcated member 130 permits the shaft 131 to move in and out as required by the pivoting of the shoe 100.

The forward end 41 of the frame member 24 is provided with a ball socket 139 in which is swivelling mounted a ball 140 having a shaft 141 extending forwardly therefrom. A bifurcated member 142 is screw-threaded into the end of the shaft 141 and a threaded shaft 143 is provided with a reduced portion 144 extending between the faces of the bifurcated elements of the bifurcated member 142. An elongated slot extends through the bifurcated member 147 and the reduced portion 144, and a pin 145 extends through the slot to maintain the reduced portion 144 within the bifurcated member 142. The outer end of the shaft 143 passes through the shoe 94 and it is secured thereon by means of inner nut 146 and outer nut 147, clamping the shoe 94 therebetween. The operation of this mounting of the shoe 94 is identical with the operation of the mounting of the shoe 100, the extensible portion being normally maintained in collapsed position by means of a spring (not shown) similar to the spring 134.

The forward end 40 of the stub frame member 38 is provided with a ball socket 148. A ball 149, swivelly mounted in the ball socket 148, has a shaft 150 extending forwardly therefrom. A bifurcated member 151 is screw-threaded into the shaft 150 and a forwardly extending threaded shaft 152 is provided with a reduced portion 153 extending into the bifurcated member 151. A slot 154 extends through the bifurcated member 151 and the reduced portion 153 of the shaft 152. A pin 155 extends through the slot 154 and maintains the shaft 152 within the bifurcated member 151. A spring 156 extends between a pin 157 on the bifurcated member and a second pin 158 on the shaft 152 and normally maintains the shaft 152 in non-extended position within the bifurcated member 151. The outer threaded end of the shaft 152 extends through the top shoe 115 and is held thereon by means of an inner nut 159 and an outer nut 160 clamping the shoe 115 therebetween. The detail view, Figure 15, of one of the swivel extension mountings is the same for each of the other two swivel extension mountings.

The bottom shoe 66 is provided with a pair of oppositely disposed pipe end engaging hooks 161, as disclosed in Figure 19. The hooks 161 are pivoted at 162 to brackets 163 mounted on the edge of the shoe 66. A spring bracket 164 extends outwardly from the shoe 66 and a coil spring 165 is connected to the spring bracket 164 and to the rear ends 166 of the hooks 161. The spring 165 normally biases the hooks 161 into pipe engaging position.

The shoe 66 is further provided with wheels 167, each of which is mounted in a rectangular box 168 on the forward and rear faces of the shoe 66. Brackets 169 support the rectangular boxes 168 by means of bolts 170 passing therethrough. Nuts 171 secure the bolts 170 in the brackets 169 and a spring 172 normally biases the wheels 167 toward the pipe. Upon the operation of the clamp, when the shoe 66 is brought into engagement with the pipe, the wheels 167 will move inwardly with relation to the shoe 66.

A hydraulic pump 173 is mounted on the plate 42. The pump 173 is of a conventional character and is controlled by means of a lever 174 extending from the side thereof. The lever 174 is pivoted to the hydraulic pump 173 at 175. A spring 176 is connected to the lever 174 and normally biases the lever 174 in a direction away from the forward end of the frame 20. The spring 176 is connected to a bracket 177 at one end, and to the upper end 178 of the lever 174 at the other end. The control cable 87 is secured to the lever 174 and may be used with the control handle 91 to move the control lever 174 in opposition to the spring 176. Fluid passing from the hydraulic pump 173 to the lower end of the hydraulic ram 69 first passes through a valve body 179 and then through fluid conduit 180 to the bottom of the ram 69. The valve body 179 contains a valve (not shown) which is normally closed by a spring 181 to prevent the flow of fluid from the bottom of the ram 69 back to the hydraulic pump 173. Thus it can be seen that fluid pumped into the ram 69 by the hydraulic pump 173 will be maintained therein under pressure so long as the valve 179 is closed. A lever 182 is pivoted on the valve body 179 at 183 and opens the valve 179 on being moved counter-clockwise. A control cable 88 is connected to the lever 182 and can be operated by means of the hand control 90 connected thereto.

An electric motor 184 is connected to the hydraulic pump 173 by any suitable means (not shown). The electric cable 89 transmits electricity to the motor 184, and the passage of electricity through the cable 89 may be controlled by the electric switch 92. A hydraulic conduit 180a is connected from the top of the hydraulic ram 69 to the hydraulic pump 173. The pump 173 is adapted to pass fluid through either the conduit 180 or the conduit 180a, depending upon the position of the control lever 174. It can be seen that the ram 69 will have its piston moved either upwardly or downwardly, depending upon which conduit 180, 180a is supplied with hydraulic fluid under pressure from the pump 173.

As illustrated in Figures 20 and 21, an adapter shoe 185 is positioned over the shoe 100 and is secured thereon by means of brackets 186 which are welded as at 187 to the adapter shoe 185. The brackets 186 extend inwardly over the side faces of the shoe 100 and are secured thereto by means of bolts 188 passing through the brackets 186 and into the shoe 100. An adapter shoe 189 is secured to the bottom shoe 66 by similar means to the connection between the shoe 100 and the adapter shoe 185. An adapter shoe 190 is secured to the top shoe 115 by means similar to the brackets 186 connecting the shoes 185 and 100. A guide plate 191 is welded at one end to the top shoe 115 and extends to engage the side face of the bracket 94. A second guide plate 192 is welded on the opposite edge of the top shoe 115 and extends over the side face of the shoe 100. Additional guide faces 191a and 192a are positioned opposite to the aforementioned guide plates on the opposite side of the shoe 115.

A bronze back-up plate 193 is adapted to be positioned within the grooves 67, 99 and 117 of the shoes 66, 94, 100 and 115, respectively. Set screws 194 extend through the side faces of the grooves in the shoes and clamp the back-up plate 193 in position. A modified back-up plate 194 is provided for each of the shoes and has a rectangular groove 195 extending peripherally of the plate. It should be understood that the groove 195 may take any shape as required by the exigencies of the project.

The auxiliary shoes 185, as disclosed in Figures 20 and 21, and the auxiliary wheels 46 provide a means whereby the clamp may be used for more than a single pipe diameter. When shoes 185, 189, 190 are attached to the present shoes and the auxiliary wheels 46 are secured to the plate 25, the effective clamping diameter of the clamp has been increased by double the increased thickness of the auxiliary shoes. Of course, it should be understood that auxiliary shoes may be fashioned in any desired thickness to adapt the clamp to any desired pipe dimension.

The back plates 193 and 194 are used to maintain a uniform inner surface under the welding operation, to assist in maintaining a uniform weld between the pipe ends. As various companies require various shapes of shoe faces under the weld, the back-up plate provides a means whereby the shoes may be adapted to the needs of the companies involved.

The pipe engaging hooks 161 disclosed in Figure 19 are adapted to snap over the ends of the pipe as the clamp begins to project from the pipe and secure the clamp against being moved rearwardly while a new section of pipe is brought into position for welding. As the new piece of pipe is brought into position, the outer curved surfaces of the hooks 161 are cammed against the edge of the new pipe thus the hooks 161 are moved inwardly to permit the welding operation to proceed.

It should be understood that the pump 173 is of the type that normally holds its pressure until it is reversed. However, the safety valve 179 also assists in preventing the loss of fluid from the pressure side of the ram 69 maintaining the clamp in engagement with the pipe until the weld is complete.

Pipe lines having relatively large diameter pipes are welded at their joints to provide a continuous integral pipe structure. In lining up the joint of the two pipes for welding, great difficulty has often been encountered in restoring the cylindrical shape of the pipes and maintaining them in aligned relation during the welding operation. The present invention, in both forms, provides four shoes for engaging the pipe ends with the top shoe of substantially smaller size than the bottom shoe, while the side shoes are approximately half the size of the bottom shoe. This particular construction serves several functions. In the first place, the small size of the top shoe permits much greater pressures to be exerted upon the pipe without increasing the size of the ram. The use of four shoes rather than three or two increases the total contact area of the outer face of the shoe with relation to the pipe, so that the inner surfaces of the pipe ends are more nearly convered by shoes than would be the case if a lesser number of shoes were used. This has the effect of more nearly restoring the cylindrical shape of the pipe and is a distinct advantage in the welding operation.

Having thus described the preferred embodiments of the invention, it should be understood that numerous modifications and structural adaptations may be resorted to without departing from the scope of the appended claims.

What is claimed is:

1. An internal expanding line-up pipe clamp comprising a frame having opposed front and rear ends, a semi-circular bottom shoe rigidly secured to the front end of said frame, a plurality of wheels, means mounting a portion of said plurality of wheels to the lower portion of the rear end of said frame, means resiliently mounting the remainder of said wheels to the lower portion of said bottom shoe to support said pipe clamp for movement through a pipe, a pair of semi-circular side shoes arranged above said bottom shoe, means pivotally securing the lower ends of said side shoes respectively to the opposite sides of said bottom shoe, a hydraulic ram mounted on said bottom shoe and extending upwardly therefrom, a piston rod operatively associated with said ram and extending upwardly therefrom, a semi-circular top shoe positioned between the upper ends of said side shoes and fixedly secured to the upper end of said piston rod, movable guide means secured to and extending forwardly on said frame, said guide means having the forward end thereof secured to said top shoe, guide plates rigidly secured to the front and rear sides of said top shoe and engaging the front and rear sides of the upper ends of said side shoes, a pair of links each pivotally secured at one end to said piston rod and at their opposite ends to the respective upper ends of said side shoes, a vertically movable pipe engaging wheel journalled on the upper rear portion of said frame, means biasing said last named wheel into engagement with the pipe, a brake pivotally secured to the center of the rear portion of said frame extending rearwardly and downwardly therefrom to engage the pipe, means biasing said brake into engagement with said pipe, a pair of pipe end engaging clamp aligning hooks pivotally secured to opposite sides of said lower shoe, means biasing said hooks outwardly to pipe end engaging position, and remotely controlled power means on said frame for operating said hydraulic ram.

2. A device as claimed in claim 1 wherein additional guide means secured to said frame and extending forwardly therefrom has the forward end thereof secured to the upper end portions respectively of said side shoes.

3. A device as claimed in claim 1 wherein remotely controlled brake means is provided on said frame for frictionally engaging said vertically movable pipe engaging wheel to retard the forward movement of said clamp in the pipe.

References Cited in the file of this patent

UNITED STATES PATENTS

| | | |
|---|---|---|
| 1,905,178 | Kohler | Apr. 25, 1933 |
| 2,408,255 | Elliot et al. | Sept. 24, 1946 |
| 2,413,103 | Forbes | Dec. 24, 1946 |
| 2,594,000 | Elliott | Apr. 22, 1952 |
| 2,630,278 | Herman | Mar. 3, 1953 |
| 2,691,952 | Wilson et al. | Oct. 19, 1954 |
| 2,694,376 | Hauser | Nov. 16, 1954 |
| 2,739,559 | Mitchell | Mar. 27, 1956 |
| 2,741,206 | Stevenson | Apr. 10, 1956 |